United States Patent
Chiu et al.

(10) Patent No.: US 9,318,987 B2
(45) Date of Patent: Apr. 19, 2016

(54) MODULARIZED CONTROL CIRCUIT OF FAN MOTOR AND METHOD OF OPERATING THE SAME

(71) Applicant: DELTA ELECTRONICS, INC., Guishan Township (TW)

(72) Inventors: Chun-Lung Chiu, Guishan Township (TW); Wen-Chuan Ma, Guishan Township (TW); Wen-Chih Wang, Guishan Township (TW)

(73) Assignee: DELTA ELECTRONICS, INC. (TW)

( * ) Notice: Subject to any disclaimer, the term of this patent is extended or adjusted under 35 U.S.C. 154(b) by 209 days.

(21) Appl. No.: 14/142,529

(22) Filed: Dec. 27, 2013

(65) Prior Publication Data

US 2015/0188466 A1 Jul. 2, 2015

(30) Foreign Application Priority Data

Dec. 27, 2012 (TW) .............................. 101150433 A

(51) Int. Cl.
*H02P 6/18* (2006.01)
(52) U.S. Cl.
CPC . *H02P 6/182* (2013.01); *H02P 6/18* (2013.01)
(58) Field of Classification Search
CPC ..................................................... H02P 6/182
USPC ............. 318/400.35, 400.34, 400.32, 400.01
See application file for complete search history.

(56) References Cited

U.S. PATENT DOCUMENTS

| | | | |
|---|---|---|---|
| 6,191,550 B1 * | 2/2001 | Yoshihara | B60L 3/0023 318/638 |
| 7,948,204 B2 * | 5/2011 | Palma | H02P 6/185 318/798 |
| 8,350,506 B2 * | 1/2013 | Doktar | H02M 1/36 318/400.11 |
| 8,879,290 B2 * | 11/2014 | Li | H02M 7/53871 323/241 |
| 2007/0194731 A1 | 8/2007 | Fukamizu et al. | |

FOREIGN PATENT DOCUMENTS

| | | |
|---|---|---|
| CN | 101179251 | 12/2010 |
| TW | 529237 | 4/2003 |

(Continued)

OTHER PUBLICATIONS

Office Action dated Jul. 25, 2014 from corresponding No. TW 101150433.

(Continued)

*Primary Examiner* — David S Luo
(74) *Attorney, Agent, or Firm* — Hauptman Ham, LLP

(57) ABSTRACT

A modularized control circuit of a fan motor is used to provide a phase-sensing control to the fan motor. The modularized control circuit includes a driving circuit and a microcontroller IC. The driving circuit is electrically connected to the fan motor to produce a plurality of analog driving voltage signals to drive the fan motor. The microcontroller IC is connected to the driving circuit and includes a phase-sensing module, a control unit, and a driving signal generator. The phase-sensing module receives the analog driving voltage signals to sense phases thereof and to produce a phase trigger signal. The control unit is connected to the phase-sensing module and receives a speed signal and the phase trigger signal to produce a control signal. The driving signal generator is connected to the control unit and receives the control signal to produce at least one switch driving signal to control the driving circuit.

18 Claims, 6 Drawing Sheets

(56) References Cited

FOREIGN PATENT DOCUMENTS

| TW | 588505 | 5/2004 |
| TW | 591884 | 6/2004 |
| TW | 200922104 | 5/2009 |
| TW | I368389 | 7/2012 |

OTHER PUBLICATIONS

Office Action dated Jan. 13, 2015 from corresponding No. TW 101150433.

Office Action dated Jul. 7, 2015 from corresponding No. TW 101150433.

* cited by examiner

MODULARIZED CONTROL CIRCUIT OF FAN MOTOR AND METHOD OF OPERATING THE SAME

This application is based on and claims the benefit of Taiwan Application No. 101150433 filed Dec. 27, 2012 the entire disclosure of which is incorporated by reference herein.

BACKGROUND OF THE INVENTION

1. Field of the Invention

The present disclosure relates generally to a control circuit of a fan motor and a method of operating the same, and more particularly to a modularized control circuit of a fan motor and a method of operating the same.

2. Description of Related Art

A rotor of the motor is correspondingly installed to a stator so that the rotor can revolve relatively to the stator according to magnetic attraction and magnetic field change between the rotor and the stator. In particular, the magnetic field change represents commutation operation of the motor magnetic poles. At present, the commutation operation is more commonly implemented by electronic commutators, which is provided to judge the rotor position by inducing magnetic pole position or magnetic field change using Hall sensors. Also, coil current of the stator is controlled by a driving circuit according to phase-switching signals sensed by the Hall sensor so as to achieve commutation operations. In addition, the magnetic field change sensed by the Hall sensor is related to rotation speed of the motor and installed position of the Hall sensor. Accordingly, the Hall sensor must be adjusted in the best position to provide the accurate sensing.

Furthermore, the motor can be controlled using sensorless schemes. Generally, a high-order digital signal processor (DSP) is used with complicated algorithms, such as the field-oriented control (FOC) and direct torque control (DTC), and peripheral circuits so as to achieve the optimal efficiency. In addition, simple control schemes, such as simple comparison circuits can be used to implement the motor control, but the efficiency is lower.

Because more and more strict demands of costs and volume in motor control technology and diversification of motor applications today, reduction of circuit components and share of circuit modules are increasingly important.

Accordingly, it is desirable to provide a modularized control circuit of a fan motor and a method of operating the same that is controlled by software, firmware, or hardware to increase reliability of operating the modularized control circuit and convenience of replacing thereof.

SUMMARY OF THE INVENTION

An object of the present disclosure is to provide a modularized control circuit of a fan motor to solve the above-mentioned problems. The modularized control circuit of the fan motor provides a phase-sensing control to the fan motor. Accordingly, the modularized control circuit includes a driving circuit and a microcontroller integrated circuit. The driving circuit is electrically connected to the fan motor and configured to produce a plurality of analog driving voltage signals to drive the fan motor. The microcontroller integrated circuit is electrically connected to the driving circuit. The microcontroller integrated circuit includes a phase-sensing module, a control unit, and a driving signal generator. The phase-sensing module receives the analog driving voltage signals and configured to sense phases of the analog driving voltage signals to produce a phase trigger signal. The control unit is connected to the phase-sensing module to receive a speed signal and the phase trigger signal and configured to produce a control signal. The driving signal generator is connected to the control unit to receive the control signal and configured to produce at least one switch driving signal to control the driving circuit.

Another object of the present disclosure is to provide a method of operating a modularized control circuit of a fan motor to solve the above-mentioned problems. The method provides a phase-sensing control to the fan motor. Accordingly, the method includes following steps: (a) providing a driving circuit to produce a plurality of analog driving voltage signals to drive the fan motor; (b) providing a phase-sensing module to receive the analog driving voltage signals and sense phases of the analog driving voltage signals to produce a phase trigger signal; (c) providing a control unit to receive a speed signal and the phase trigger signal to produce a control signal; and (d) providing a driving signal generator to receive the control signal and produce at least one switch driving signal to control the driving circuit.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWING

The features of the invention believed to be novel are set forth with particularity in the appended claims. The invention itself, however, may be best understood by reference to the following detailed description of the invention, which describes an exemplary embodiment of the invention, taken in conjunction with the accompanying drawings, in which:

DETAILED DESCRIPTION OF THE INVENTION

Figure 1:
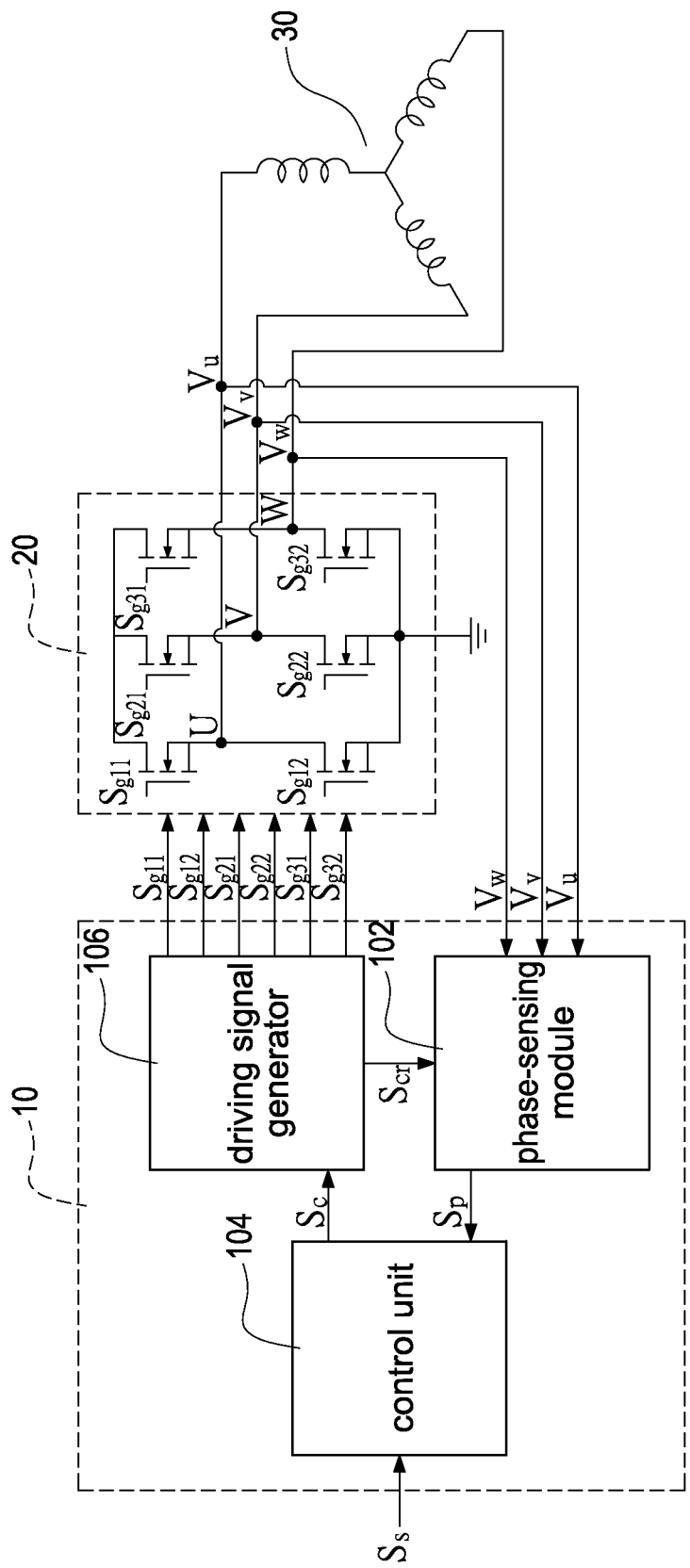
FIG. 1 is a schematic circuit block diagram of a modularized control circuit of a fan motor according to the present disclosure.

Reference will now be made to the drawing figures to describe the present invention in detail.

Reference is made to FIG. 1 which is a schematic circuit block diagram of a modularized control circuit of a fan motor according to the present disclosure. The modularized control circuit of the fan motor provides a phase-sensing control to the fan motor 30. The modularized control circuit includes a driving circuit 20 and a microcontroller integrated circuit 10 (hereinafter referred to as microcontroller IC 10).

The driving circuit 20 is electrically connected to the fan motor 30 to produce a plurality of analog driving voltage signals to drive the fan motor 30. In particular, the driving circuit 20 is a three-phase driving circuit having six switches on three sets of legs. In this embodiment, the fan motor 30 is a three-phase motor. The driving circuit 20 provides three analog driving voltage signals, namely, a u-phase analog driving voltage signals Vu, a v-phase analog driving voltage signals Vv, and a w-phase analog driving voltage signals Vw to control the fan motor 30.

The microcontroller IC 10 is electrically connected to the driving circuit 20. The microcontroller IC 10 includes a phase-sensing module 102, a control unit 104, and a driving signal generator 106. Especially, the phase-sensing module 102, the control unit 104, and the driving signal generator 106 are packaged into the microcontroller IC 10 to form a modularized structure. Also, the microcontroller IC 10 can be a microprocessor ($\mu$P), a microcontroller ($\mu$C), a field-programmable gate array (FPGA), a programmable integrated circuit, or an application-specific integrated circuit (ASIC). The phase-sensing module 102 receives the analog driving voltage signals Vu,Vv,Vw to sense phases of the analog driving voltage signals Vu,Vv,Vw to produce a phase trigger signal Sp. The control unit 104 is connected to the phase-sensing module 102 to receive an external speed signal Ss and the phase trigger signal Sp to produce a control signal Sc. In particular, the external speed signal Ss is controlled to adjust speed of the fan motor 30. The driving signal generator 106 is connected to the control unit 104 to receive the control signal Sc to produce a plurality of switch driving signals Sg11,Sg12, Sg21,Sg22,Sg31,Sg32, thus driving the corresponding switches of the driving circuit 20. In particular, the switch driving signals Sg11,Sg12,Sg21,Sg22,Sg31,Sg32 are provided to the six switches on three sets of legs of the driving circuit 20, respectively.

Figure 2:
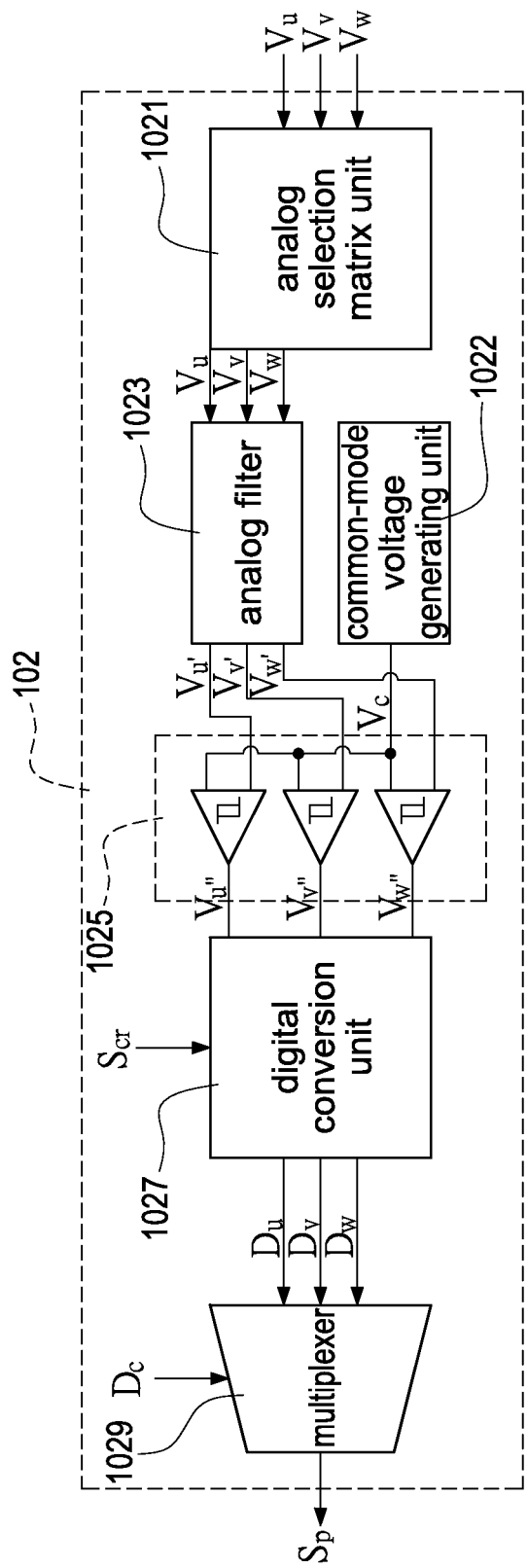
FIG. 2 is a schematic circuit block diagram of a phase-sensing module of the modularized control circuit according to a preferred embodiment of the present disclosure.

In addition, reference is made to FIG. 2 which is a schematic circuit block diagram of a phase-sensing module of the modularized control circuit according to a preferred embodiment of the present disclosure. The phase-sensing module 102 has an analog selection matrix unit 1021, an analog filter 1023, a three-phase analog comparator 1025, a digital conversion unit 1027, and a multiplexer 1029.

The analog selection matrix unit 1021 has a plurality of input terminals to receive the analog driving voltage signals Vu,Vv,Vw to judge a voltage system type according to the analog driving voltage signals Vu,Vv,Vw. In particular, the analog selection matrix unit 1021 is a register or a memory for storing data. In this embodiment, the voltage system type is a three-phase three-wire (3Φ3W) system. In addition, a three-phase four-wire (3Φ4W) system is also another common voltage system type, that is, a neutral point is further provided.

The analog filter 1023 is connected to the analog selection matrix unit 1021 to filter the analog driving voltage signals Vu,Vv,Vw to produce filtered analog driving voltage signals Vu',Vv',Vw'. In particular, the three-phase analog comparator 1025 has a u-phase analog comparator, a v-phase analog comparator, and a w-phase analog comparator. The u-phase, v-phase, and w-phase analog comparator are connected to the analog filter 1023, respectively, to receive the filtered analog driving voltage signals Vu',Vv',Vw' to compare phase sequence of the filtered analog driving voltage signals Vu', Vv',Vw' and produce analog comparing voltage signals Vu", Vv",Vw". That is, the u-phase analog comparator receives the u-phase filtered analog driving voltage signal Vu', the v-phase analog comparator receives the v-phase filtered analog driving voltage signal Vv', and the w-phase analog comparator receives the w-phase filtered analog driving voltage signal Vw'. In addition, the phase-sensing module 102 further has a common-mode voltage generating unit 1022, which provides a neutral common-mode voltage Vc to the u-phase analog comparator, the v-phase analog comparator, and the w-phase analog comparator, respectively. That is, the three-phase analog comparator 1025 receives the neutral common-mode voltage Vc and the filtered analog driving voltage signals Vu',Vv',Vw' and then the filtered analog driving voltage signals Vu',Vv',Vw' are compared with the neutral common-mode voltage Vc by the three-phase analog comparator 1025 by using a zero crossing scheme to acquire phase sequence of the filtered analog driving voltage signals Vu',Vv',Vw'.

The digital conversion unit 1027 is connected to the three-phase analog comparator 1025 to convert the analog comparing voltage signals Vu",Vv",Vw" into digital driving voltage signals Du,Dv,Dw. The multiplexer 1029 is connected to the digital conversion unit 1027 to receive the digital driving voltage signals Du,Dv,Dw to produce the phase trigger signal Sp. In particular, the phase trigger signal Sp is produced by selecting one of the digital driving voltage signals Du,Dv,Dw according to a control signal Dc by the multiplexer 1029, and then the phase trigger signal Sp is sent to the control unit 104 (as shown in FIG. 1).

Figure 3A:
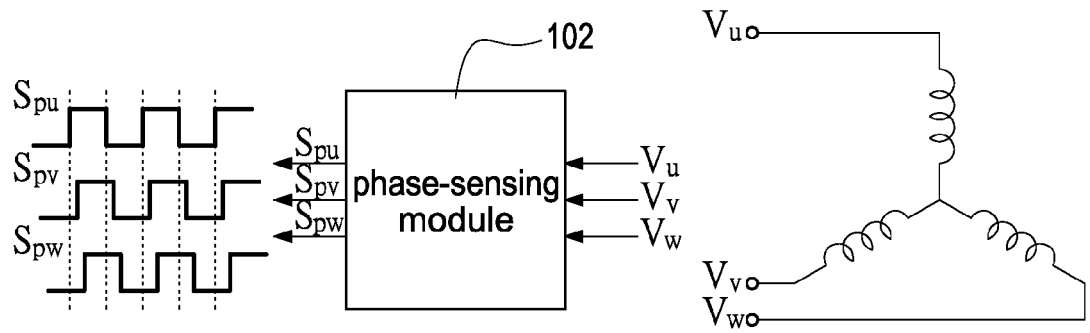
FIG. 3A is a schematic view of operating the phase-sensing module according to a first embodiment of the present disclosure.
Figure 3B:
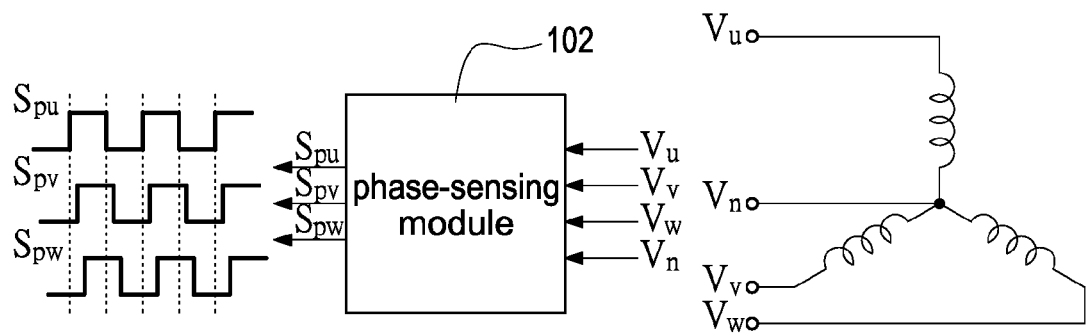
FIG. 3B is a schematic view of operating the phase-sensing module according to a second embodiment of the present disclosure.
Figure 3C:
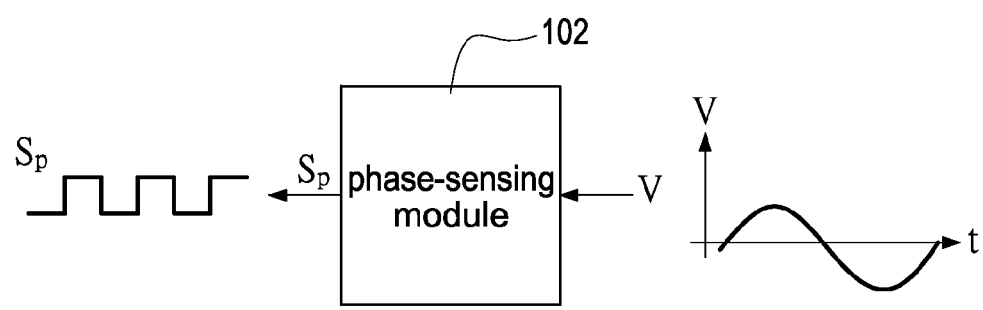
FIG. 3C is a schematic view of operating the phase-sensing module according to a third embodiment of the present disclosure.

Especially, the phase-sensing module 102 can output different types of the phase trigger signal Sp according to different analog input voltages. Reference is made to FIG. 3A to FIG. 3C which is a schematic view of operating the phase-sensing module according to a first, second, and third embodiment of the present disclosure, respectively. The first embodiment (as shown in FIG. 3A) represents that the analog driving voltage signals Vu,Vv,Vw form the three-phase three-wire (3Φ3W) voltage system type. The analog selection matrix unit 1021 receives the analog driving voltage signals Vu,Vv,Vw and judges that the analog driving voltage signals Vu,Vv,Vw form the three-phase three-wire (3Φ3W) voltage system type. The analog filter 1023 filters the analog driving voltage signals Vu,Vv,Vw to output the filtered analog driving voltage signals Vu',Vv',Vw'. The three-phase analog comparator 1025 receives the filtered analog driving voltage signals Vu',Vv',Vw' to compare with the neutral common-mode voltage Vc, which is produced by the common-mode voltage generating unit 1022 only in the three-phase three-wire (3Φ3W) voltage system type, to acquire phase sequence of the filtered analog driving voltage signals Vu',Vv',Vw' using a zero crossing scheme to produce the analog comparing voltage signals Vu",Vv",Vw". The digital conversion unit 1027 converts the analog comparing voltage signals Vu",Vv", Vw" into digital driving voltage signals Du,Dv,Dw. The multiplexer 1029 receives the digital driving voltage signals Du,Dv,Dw and the control signal Dc to select one of the digital driving voltage signals Du,Dv,Dw according to the control signal Dc to produce the phase trigger signal Sp.

The second embodiment (as shown in FIG. 3B) represents that the analog driving voltage signals Vu,Vv,Vw form the three-phase four-wire (3Φ4W) voltage system type. In the voltage system type, the fan motor 30 provides a neutral point. Also, the driving circuit 20 outputs a neutral-point voltage Vn as well as the analog driving voltage signals Vu,Vv,Vw. The analog selection matrix unit 1021 receives the analog driving voltage signals Vu,Vv,Vw and the neutral-point voltage Vn and judges that the analog driving voltage signals Vu,Vv,Vw and the neutral-point voltage Vn form the three-phase four-wire (3Φ4W) voltage system type. The analog filter 1023 filters the analog driving voltage signals Vu,Vv, Vw to output the filtered analog driving voltage signals Vu', Vv',Vw'. The three-phase analog comparator 1025 receives the filtered analog driving voltage signals Vu',Vv',Vw' to compare with the neutral-point voltage Vn, which is as a reference voltage only in the three-phase four-wire (3Φ4W) voltage system type, to acquire phase sequence of the filtered analog driving voltage signals Vu',Vv',Vw' using a zero crossing scheme to produce the analog comparing voltage signals Vu",Vv",Vw". Especially, in the three-phase four-wire (3Φ4W) voltage system type, the neutral-point voltage Vn is directly used instead of a neutral common-mode voltage Vc in the three-phase three-wire (3Φ3W) voltage system type, thus without using the common-mode voltage generating unit 1022. The digital conversion unit 1027 converts the analog comparing voltage signals Vu",Vv",Vw" into digital driving voltage signals Du,Dv,Dw. The multiplexer 1029 receives the digital driving voltage signals Du,Dv,Dw and the control signal Dc to select one of the digital driving voltage signals Du,Dv,Dw according to the control signal Dc to produce the phase trigger signal Sp.

The third embodiment (as shown in FIG. 3C) represents that the analog driving voltage signal forms the single-phase (1Φ) voltage system type. The analog selection matrix unit 1021 receives the analog driving voltage signal and judges that the analog driving voltage signal forms the single-phase (1Φ) voltage system type. The analog filter 1023 filters the analog driving voltage signal to output the filtered analog driving voltage signal. In the single-phase (1Φ) voltage system type, the phase-sensing module 102 has a single-phase analog comparator. The single-phase analog comparator receives the filtered analog driving voltage signal to compare with the a comparison voltage, which is as a reference voltage only in the single-phase (1Φ) voltage system type, to acquire phase sequence of the filtered analog driving voltage signal to produce the analog comparing voltage signal. The digital conversion unit 1027 converts the analog comparing voltage signal into a digital driving voltage signal. The multiplexer 1029 receives the digital driving voltage signal to produce the phase trigger signal Sp.

Figure 4:
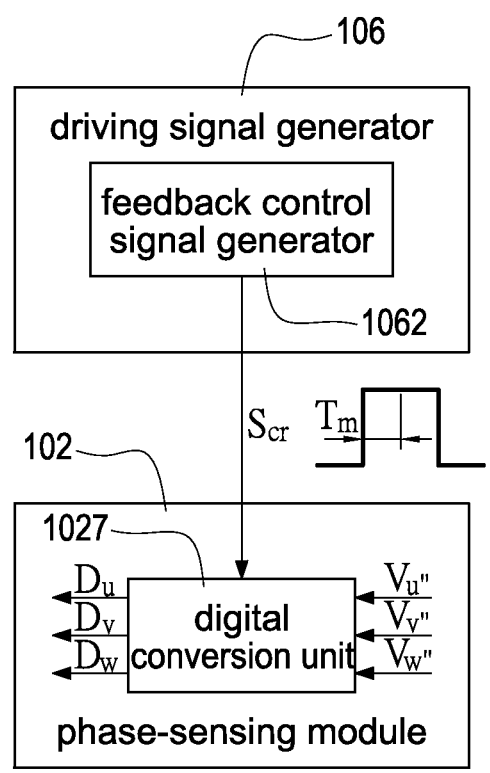
FIG. 4 is a schematic block diagram of receiving a feedback control signal by the phase-sensing module according to the present disclosure.

Reference is made to FIG. 4 which is a schematic block diagram of receiving a feedback control signal by the phase-sensing module according to the present disclosure. The driving signal generator 106 has a feedback control signal generator 1062. The feedback control signal generator 1062 produces a feedback control signal Scr with a signal masking interval Tm. In particular, time length of the signal masking interval Tm is adjustable. The digital conversion unit 1027 of the phase-sensing module 102 receives the feedback control signal Scr. During the signal masking interval Tm, the analog comparing voltage signals Vu",Vv",Vw" outputted from the three-phase analog comparator 1025 are masked so that noise components involved in the analog comparing voltage signals Vu",Vv",Vw" can be reduced so as to significantly improve the signal distortion of the digital driving voltage signals Du,Dv,Dw outputted from the digital conversion unit 1027 and avoid incorrect signal conversions from the distorted phase trigger signal Sp. The detailed operation of masking noise components will be described hereinafter as follows.

Figure 5:
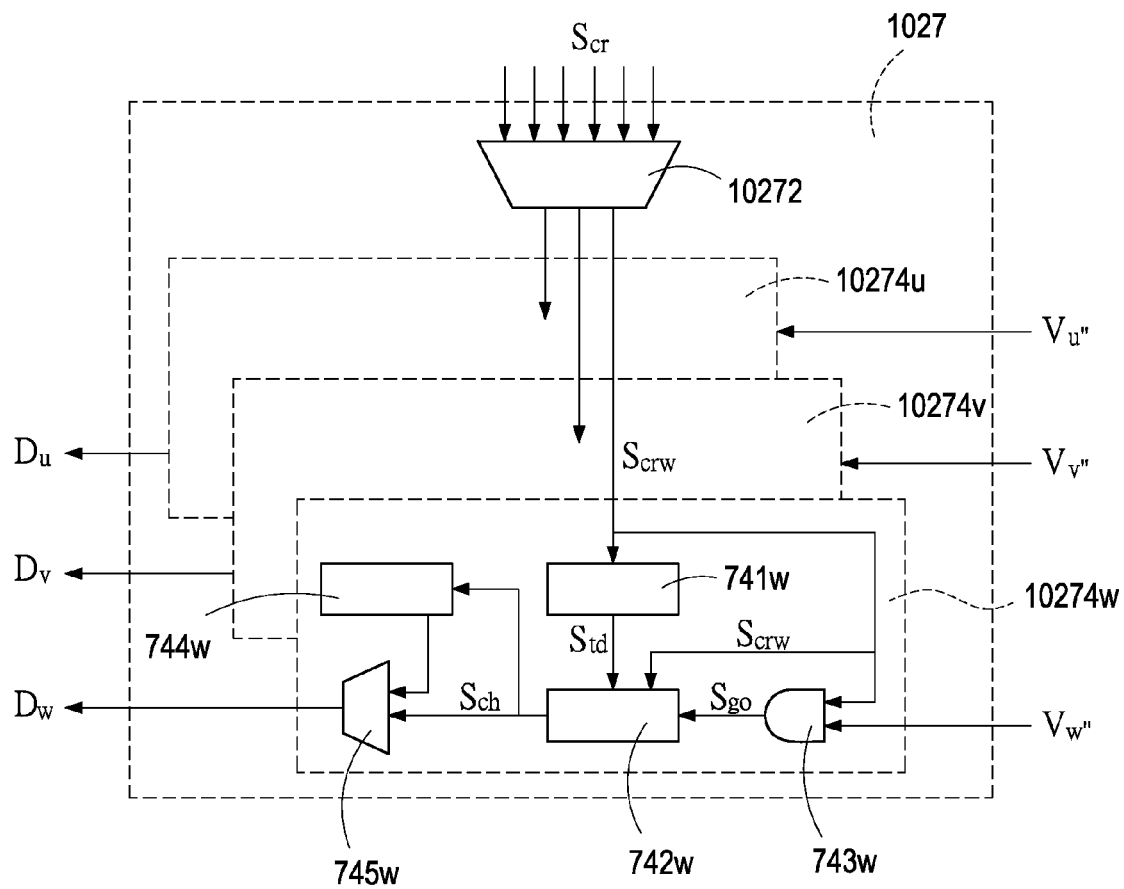
FIG. 5 is a schematic block diagram of a digital conversion unit of the phase-sensing module.

Reference is made to FIG. 5 which is a schematic block diagram of a digital conversion unit of the phase-sensing module. The digital conversion unit 1027 mainly includes a signal selection unit 10272 and a plurality of conversion circuits 10274. In particular, because the three-phase analog comparing voltage signals Vu",Vv",Vw" are exemplified for further demonstration, the conversion circuits 10274 has a u-phase conversion circuit 10274u, a v-phase conversion circuit 10274v, and a w-phase conversion circuit 10274w. The signal selection unit 10272 receives the feedback control signal Scr generated from the feedback control signal generator 1062, and selects three signals among the feedback control signal Scr, including a u-phase feedback control signal Scru, a v-phase feedback control signal Scrv, and a w-phase feedback control signal Scrw, are correspondingly transmitted to the u-phase conversion circuit 10274u, the v-phase conversion circuit 10274v, and the w-phase conversion circuit 10274w. For convenience, the w-phase operation is exemplified to further demonstrate the present invention, and other phases are in like manner.

The w-phase conversion circuit 10274w has a delay time setting unit 741, a latch unit 742, a logic gate unit 743, a programmable PLL/FLL unit 744, and a multiplexer unit 745.

The w-phase conversion circuit 10274w receives a w-phase feedback control signal Scrw outputted from the signal selection unit 10272. More specifically, the w-phase feedback control signal Scrw outputted from the signal selection unit 10272 is transmitted to the delay time setting unit 741, the latch unit 742, and the logic gate unit 743. The logic gate unit 743 further receives the w-phase analog comparing voltage signal Vw", and executes an AND operation between the w-phase feedback control signal Scrw and the w-phase analog comparing voltage signal Vw" to output a logic output signal Sgo. In addition, the w-phase feedback control signal Scrw is processed by the delay time setting unit 741 to output a delay time signal Std.

The latch unit 742 receives the w-phase feedback control signal Scrw, the logic output signal Sgo, and the delay time signal Std, and executes operations of latching the signals to keep data status and outputs a latch output signal Sch. The latch output signal Sch is transmitted to the programmable PLL/FLL unit 744 and the multiplexer unit 745. The programmable PLL/FLL unit 744 is used to set frequency of phase lock and trigger the latch output signal Sch to generate a frequency difference or a phase difference which is higher than that of the input signal to the multiplexer unit 745. Finally, the w-phase digital driving voltage signal Dw is generated by the multiplexer unit 745. Accordingly, the masking operation can be predicted, dynamically adjusted, and increased resolution thereof so that noise components involved in the analog comparing voltage signals Vu",Vv", Vw" can be reduced so as to significantly improve the signal distortion of the digital driving voltage signals Du,Dv,Dw and avoid incorrect signal conversions from the distorted phase trigger signal Sp.

Figure 6:
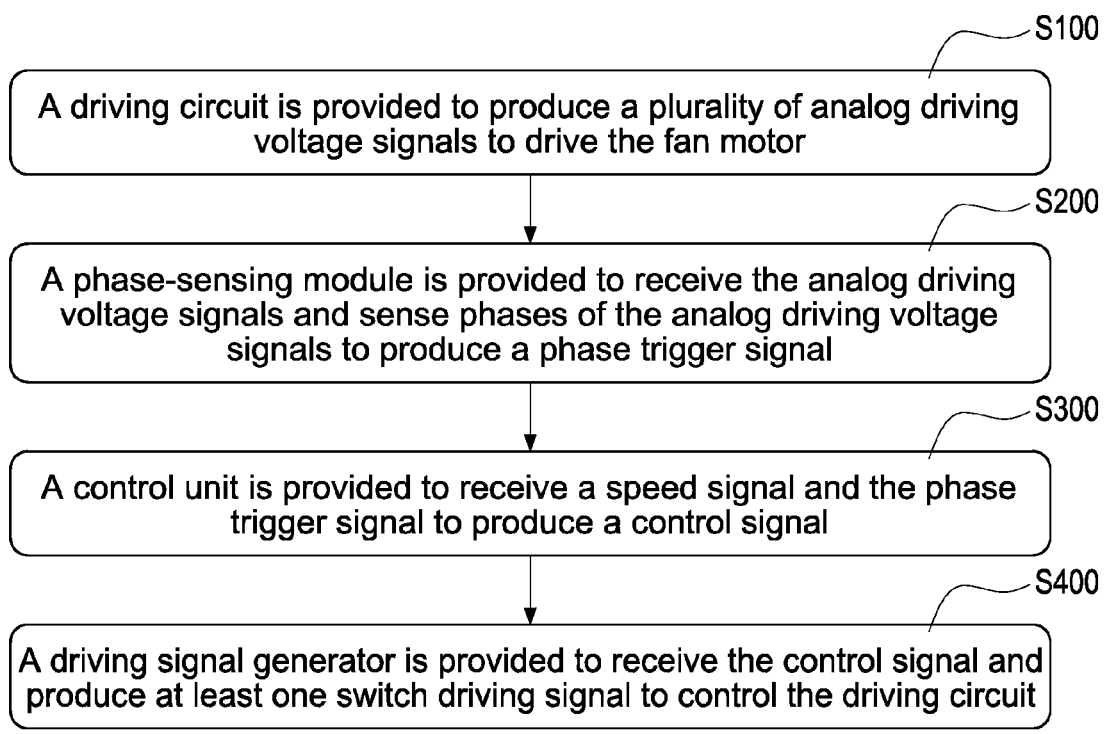
FIG. 6 is a flowchart of a method of operating a modularized control circuit of a fan motor according to the present disclosure.

Reference is made to FIG. 6 which is a flowchart of a method of operating a modularized control circuit of a fan motor according to the present disclosure. The method provides a phase-sensing control to the fan motor and the method includes following steps.

A driving circuit is provided to produce a plurality of analog driving voltage signals to drive the fan motor (S100). In particular, if the fan motor is a three-phase motor and the driving circuit is a three-phase driving circuit having six switches on three sets of legs.

A phase-sensing module is provided to receive the analog driving voltage signals and sense phases of the analog driving voltage signals to produce a phase trigger signal (S200). The phase-sensing module has an analog selection matrix unit, an analog filter, a three-phase analog comparator, a digital conversion unit, and a multiplexer. The analog selection matrix unit has a plurality of input terminals to receive the analog driving voltage signals judge a voltage system type according to the analog driving voltage signals. In particular, if the voltage system type is a single-phase system, the phase trigger signal is a single-phase pulse signal. If the voltage system type is a three-phase three-wire (3Φ3W) system or a three-phase four-wire (3Φ4W) system, the phase trigger signal is a three-phase pulse signal. The analog filter is connected to the analog selection matrix unit to filter the analog driving voltage signals to produce filtered analog driving voltage signals. The three-phase analog comparator is connected to the analog filter to receive the filtered analog driving voltage signals to compare phase sequence of the filtered analog driving voltage signals by using a zero crossing scheme and produce analog comparing voltage signals. The digital conversion unit is connected to the three-phase analog comparator to convert the analog comparing voltage signals into digital driving voltage signals. The multiplexer is connected to the digital conversion unit to receive the digital driving voltage signals to produce the phase trigger signal.

A control unit is provided to receive a speed signal and the phase trigger signal to produce a control signal (S300).

A driving signal generator is provided to receive the control signal and produce at least one switch driving signal to control the driving circuit (S400). In particular, the driving signal generator has a feedback control signal generator. The feedback control signal generator produces a feedback control signal with a signal masking interval. In particular, time length of the signal masking interval is adjustable. The digital conversion unit of the phase-sensing module receives the feedback control signal. During the signal masking interval, the analog comparing voltage signals outputted from the three-phase analog comparator are masked so that noise components involved in the analog comparing voltage signals can be reduced so as to significantly improve the signal distortion of the digital driving voltage signals outputted from the digital conversion unit and avoid incorrect signal conversions from the distorted phase trigger signal.

The phase-sensing module, the control unit, and the driving signal generator are packaged into a microcontroller integrated circuit to form a modularized structure. Also, the microcontroller IC can be a microprocessor (μP), a microcontroller (μC), a field-programmable gate array (FPGA), a programmable integrated circuit, or an application-specific integrated circuit (ASIC).

In conclusion, the present disclosure has following advantages:

1. The phase-sensing module 102, the control unit 104, and the driving signal generator 106 are packaged into a microcontroller IC 10 to form a modularized structure, which is controlled by software, firmware, or hardware to increase reliability of operating the modularized control circuit and convenience of replacing thereof;

2. The analog selection matrix unit 1021 of the phase-sensing module 102 is used to receive the analog driving voltage signals Vu,Vv,Vw to judge the voltage system type according to the analog driving voltage signals Vu,Vv,Vw, thus providing more adaptive and flexible phase-sensing operation depended on the corresponding voltage system type; and 3. The feedback control signal Scr with the signal masking interval Tm is provided so that during the signal masking interval, the analog comparing voltage signals Vu",Vv",Vw" are masked and noise components involved in the analog comparing voltage signals Vu",Vv",Vw" can be reduced so as to significantly improve the signal distortion of the digital driving voltage signals Du,Dv,Dw and avoid incorrect signal conversions from the distorted phase trigger signal.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A modularized control circuit of a fan motor providing a phase-sensing control to the fan motor; the modularized control circuit comprising:
   a driving circuit electrically connected to the fan motor and configured to produce a plurality of analog driving voltage signals to drive the fan motor; and
   a microcontroller integrated circuit electrically connected to the driving circuit, the microcontroller integrated circuit comprising:
      a phase-sensing module receiving the analog driving voltage signals and configured to sense phases of the analog driving voltage signals to produce a phase trigger signal, the phase-sensing module comprising:
         an analog selection matrix unit having a plurality of input terminals to receive the analog driving voltage signals and configured to judge a voltage system type according to the analog driving voltage signals;
         an analog filter connected to the analog selection matrix unit and configured to filter the analog driving voltage signals to produce filtered analog driving voltage signals;
         a three-phase analog comparator connected to the analog filter to receive the filtered analog driving voltage signals and configured to compare phase sequence of the filtered analog driving voltage signals and provide analog comparing voltage signals;
         a digital conversion unit connected to the three-phase analog comparator and configured to convert the analog comparing voltage signals into digital driving voltage signals; and
         a multiplexer connected to the digital conversion unit to receive the digital driving voltage signals and configured to produce the phase trigger signal;
      a control unit connected to the phase-sensing module to receive a speed signal and the phase trigger signal and configured to produce a control signal; and
      a driving signal generator connected to the control unit to receive the control signal and configured to produce at least one switch driving signal to control the driving circuit.

2. The modularized control circuit in claim 1, wherein the three-phase analog comparator compares phase sequence of the filtered analog driving voltage signals by using a zero crossing scheme.

3. The modularized control circuit in claim 2, wherein the phase-sensing module further comprises a common-mode voltage generating unit; the common-mode voltage generating unit generates a neutral common-mode voltage; when the voltage system type is a three-phase three-wire (3Φ3W) system, the filtered analog driving voltage signals are compared with the neutral common-mode voltage by the three-phase analog comparator by using a zero crossing scheme to acquire phase sequence of the filtered analog driving voltage signals.

4. The modularized control circuit in claim 2, wherein the analog selection matrix unit receives a neutral-point voltage; when the voltage system type is a three-phase four-wire (3Φ4W) system, the filtered analog driving voltage signals are compared with the neutral-point voltage by the three-phase analog comparator by using a zero crossing scheme to acquire phase sequence of the filtered analog driving voltage signals.

5. The modularized control circuit in claim 1, wherein the phase trigger signal is a single-phase pulse signal when the voltage system type is a single-phase system.

6. The modularized control circuit in claim 1, wherein the phase trigger signal is a three-phase pulse signal when the voltage system type is a three-phase three-wire system.

7. The modularized control circuit in claim 1, wherein the phase trigger signal is a three-phase pulse signal when the voltage system type is a three-phase four-wire system.

8. The modularized control circuit in claim 1, wherein the phase-sensing module further comprises a single-phase analog comparator; when the voltage system type is a single-phase (1Φ) system, the filtered analog driving voltage signal is compared with a comparison voltage by the single-phase analog comparator to acquire phase sequence of the filtered analog driving voltage signal.

9. The modularized control circuit in claim 1, wherein the driving signal generator comprises a feedback control signal generator, the feedback control signal generator is configured to produce a feedback control signal with a signal masking interval; the digital conversion unit of the phase-sensing module receives the feedback control signal; during the signal masking interval, the analog comparing voltage signals outputted from the three-phase analog comparator are masked to reduce noise components involved in the analog comparing voltage signals.

10. The modularized control circuit in claim 9, wherein the digital conversion unit has a signal selection unit and a plurality of conversion circuits; the signal selection unit is configured to receive the feedback control signal generated from the feedback control signal generator, select signals among the feedback control signal, and correspondingly transmit the selected signals to the conversion circuits; each conversion circuit has a delay time setting unit, a latch unit, a logic gate unit, a programmable PLL/FLL unit, and a multiplexer unit; the selected signal is received by the delay time setting unit, the latch unit, and the logic gate unit; the logic gate unit is further configured to receive the analog comparing voltage signal, and execute an AND operation between the selected signal and the analog comparing voltage signal to output a logic output signal; the delay time setting unit is configured to process the selected signal to output a delay time signal; the latch unit is configured to receive the selected signal, the logic output signal, and the delay time signal, and execute a latch operation to the signals to output a latch output signal; the programmable PLL/FLL unit and the multiplexer unit are configured to receive the latch output signal; the programmable PLL/FLL unit is configured to set a phase-lock frequency and generate a frequency difference or a phase difference according to the latch output signal, and the multiplexer unit is configured to output the digital driving voltage signal.

11. A method of operating a modularized control circuit of a fan motor providing a phase-sensing control to the fan motor; the method comprising:
providing a driving circuit to produce a plurality of analog driving voltage signals to drive the fan motor;
providing a phase-sensing module to receive the analog driving voltage signals and sense phases of the analog driving voltage signals to produce a phase trigger signal;
providing a control unit to receive a speed signal and the phase trigger signal to produce a control signal; and
providing a driving signal generator to receive the control signal and produce at least one switch driving signal to control the driving circuit,
wherein the phase-sensing module comprises:
an analog selection matrix unit having a plurality of input terminals to receive the analog driving voltage signals and configured to judge a voltage system type according to the analog driving voltage signals;
an analog filter connected to the analog selection matrix unit and configured to filter the analog driving voltage signals to produce filtered analog driving voltage signals;
a three-phase analog comparator connected to the analog filter to receive the filtered analog driving voltage signals and configured to compare phase sequence of the filtered analog driving voltage signals and provide analog comparing voltage signals;
a digital conversion unit connected to the three-phase analog comparator and configured to convert the analog comparing voltage signals into digital driving voltage signals; and
a multiplexer connected to the digital conversion unit to receive the digital driving voltage signals and configured to produce the phase trigger signal.

12. The method of operating the modularized control circuit in claim 11, wherein the phase-sensing module, the control unit, and the driving signal generator are packaged into a microcontroller integrated circuit to form a modularized structure.

13. The method of operating the modularized control circuit in claim 11, wherein the three-phase analog comparator compares phase sequence of the filtered analog driving voltage signals by using a zero crossing scheme.

14. The method of operating the modularized control circuit in claim 11, wherein the phase trigger signal is a single-phase pulse signal when the voltage system type is a single-phase system.

15. The method of operating the modularized control circuit in claim 11, wherein the phase trigger signal is a three-phase pulse signal when the voltage system type is a three-phase three-wire system.

16. The method of operating the modularized control circuit in claim 11, wherein the phase trigger signal is a three-phase pulse signal when the voltage system type is a three-phase four-wire system.

17. The method of operating the modularized control circuit in claim 11, wherein the driving signal generator comprises a feedback control signal generator, the feedback control signal generator is configured to produce a feedback control signal with a signal masking interval; the digital conversion unit of the phase-sensing module receives the feedback control signal; during the signal masking interval, the analog comparing voltage signals outputted from the three-phase analog comparator are masked to reduce noise components involved in the analog comparing voltage signals.

18. The method of operating the modularized control circuit in claim 17, wherein the digital conversion unit has a signal selection unit and a plurality of conversion circuits; the signal selection unit is configured to receive the feedback control signal generated from the feedback control signal generator, select signals among the feedback control signal, and correspondingly transmit the selected signals to the conversion circuits; each conversion circuit has a delay time setting unit, a latch unit, a logic gate unit, a programmable PLL/FLL unit, and a multiplexer unit; the selected signal is received by the delay time setting unit, the latch unit, and the logic gate unit; the logic gate unit is further configured to receive the analog comparing voltage signal, and execute an AND operation between the selected signal and the analog comparing voltage signal to output a logic output signal; the delay time setting unit is configured to process the selected signal to output a delay time signal; the latch unit is configured to receive the selected signal, the logic output signal, and the delay time signal, and execute a latch operation to the signals to output a latch output signal; the programmable PLL/FLL unit and the multiplexer unit are configured to receive the latch output signal; the programmable PLL/FLL unit is configured to set a phase-lock frequency and generate a frequency difference or a phase difference according to the latch output signal, and the multiplexer unit is configured to output the digital driving voltage signal.

* * * * *